United States Patent [19]

Cretella et al.

[11] 4,050,133
[45] Sept. 27, 1977

[54] METHOD OF REFURBISHING TURBINE VANES AND THE LIKE

[76] Inventors: Salvatore J. Cretella, 180 Fitch St., North Haven, Conn. 06473; Matthew Bernardo, 62 Lee St., West Haven, Conn. 06516; Ralph T. DeMusis, 547 Foxon Road, North Branford, Conn. 06473

[21] Appl. No.: 693,640

[22] Filed: June 7, 1976

[51] Int. Cl.² .......................... B23P 7/00; B23P 15/02
[52] U.S. Cl. ........................ 29/156.8 B; 29/401 A; 29/421 R; 427/34; 427/423; 416/241 R
[58] Field of Search ................. 29/156.8 B, 156.8 H, 29/401 A, 401 E, 401 R, 402, 421 R, 527.2; 427/423, 34, 331, 191; 416/97, 241 R

[56] References Cited

U.S. PATENT DOCUMENTS

| | | | |
|---|---|---|---|
| 1,914,774 | 6/1933 | Govers | 427/238 |
| 2,120,525 | 6/1938 | McKerihan | 29/401 A |
| 2,575,656 | 11/1951 | Coe, Jr. et al. | 51/141 |
| 2,878,140 | 3/1959 | Barr | 29/421 R |
| 3,015,880 | 1/1962 | Stephenson | 427/423 |
| 3,576,065 | 4/1971 | Frazier | 29/156.8 H |
| 3,650,635 | 3/1972 | Wachtell et al. | 416/97 |

FOREIGN PATENT DOCUMENTS

| | | | |
|---|---|---|---|
| 140,341 | 2/1951 | Australia | 29/156.8 B |
| 838,839 | 6/1960 | United Kingdom | 29/157.1 R |

Primary Examiner—C.W. Lanham
Assistant Examiner—Daniel C. Crane
Attorney, Agent, or Firm—H. Gibner Lehmann; K. Gibner Lehmann

[57] ABSTRACT

A method for repairing turbine vanes and the like which have become worn or cracked after extended periods of use. The method embraces the steps of applying molten metal containing a predetermined quantity of silicon to the cracks, and overall to the worn or eroded areas of the vane to build up the same beyond its original surface, sintering the vane in a furnace at a temperature of over 2,000° F thereby burning off some of the silicon, allowing the vane to cool, and thereafter placing it in a high pressure furnace and subjecting it simultaneously to heating to a temperature in excess of 2,000° F and a pressure in excess of 15,000 PSI to drive the build-up material into all of the cracks of the vane and simultaneously effect a densification of the material as well as improving the bond to the original eroded surfaces. Thereafter the vane is removed and allowed to cool, and the built-up surface of the vane is ground down so as to restore the dimensions of the piece substantially to those of a new part.

14 Claims, 16 Drawing Figures

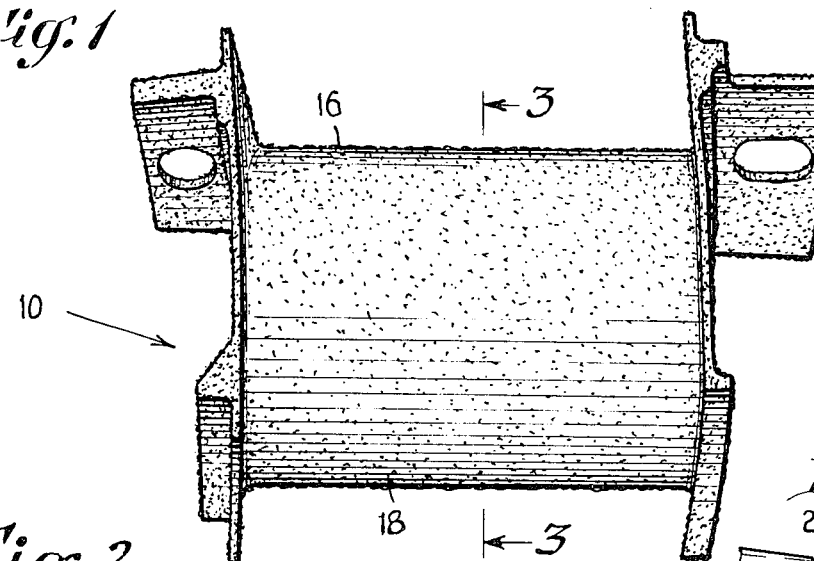
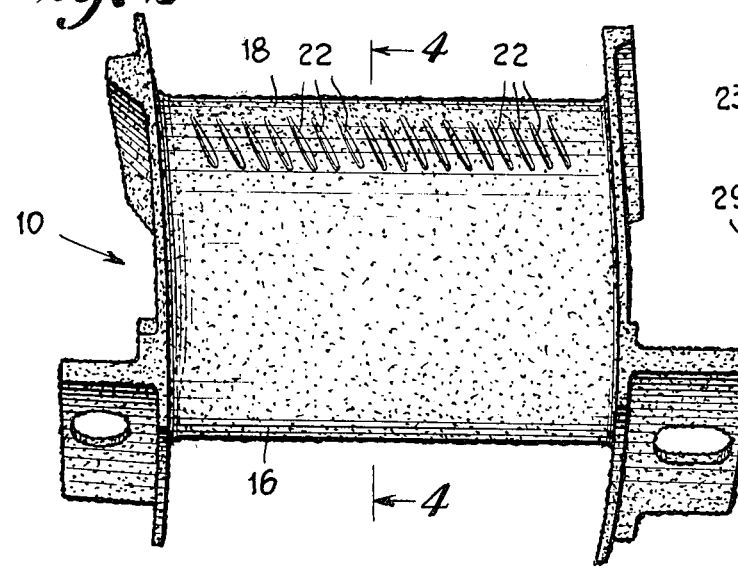
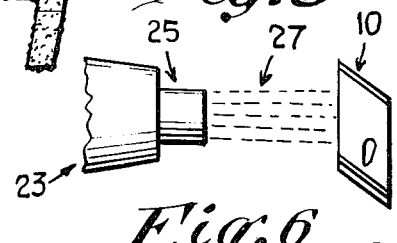
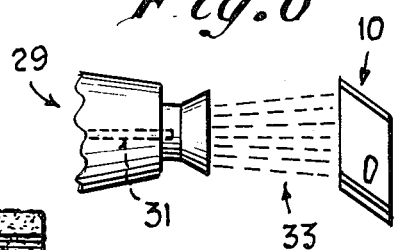
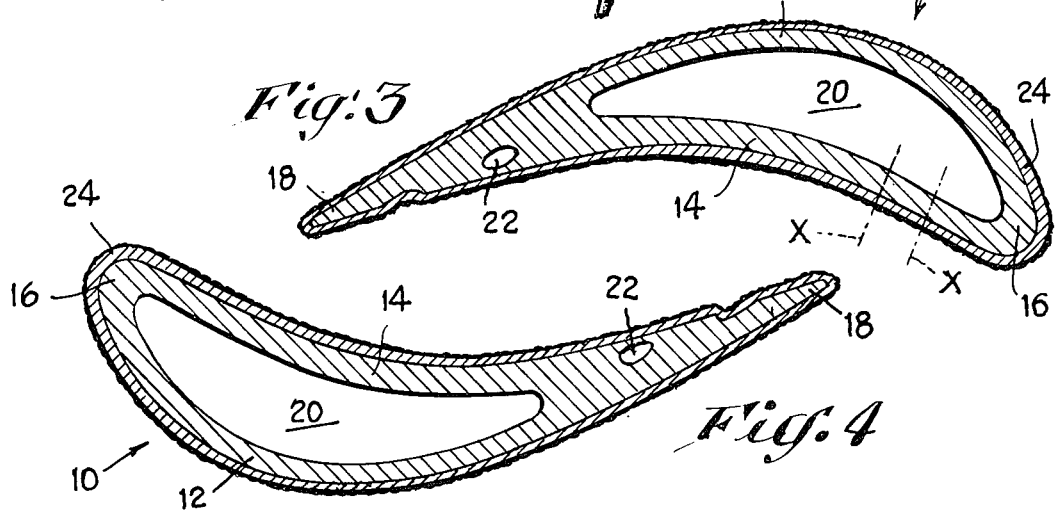

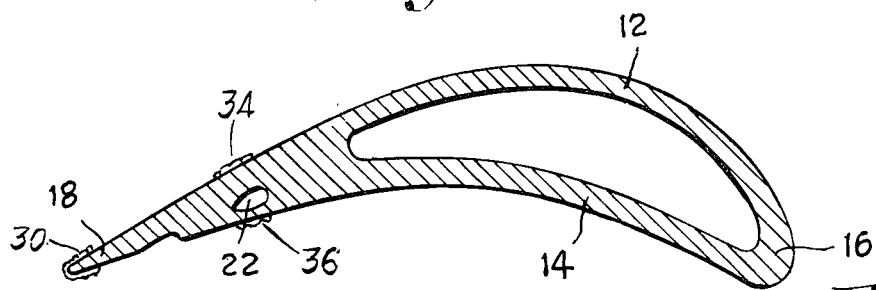
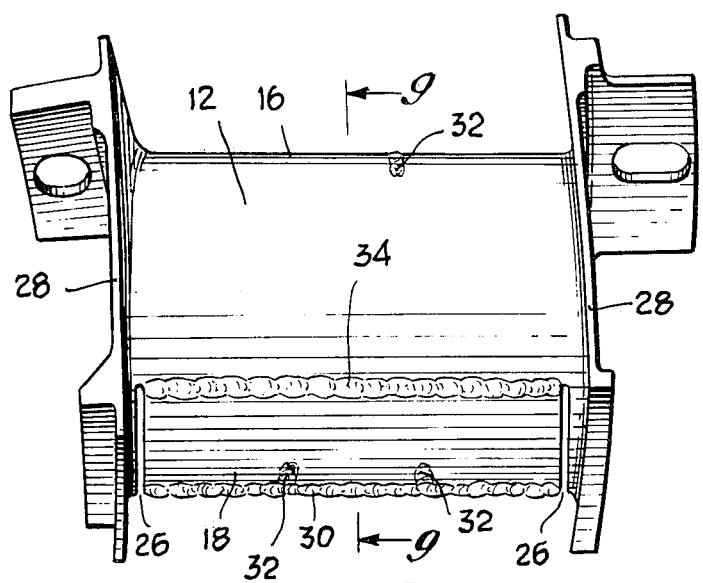
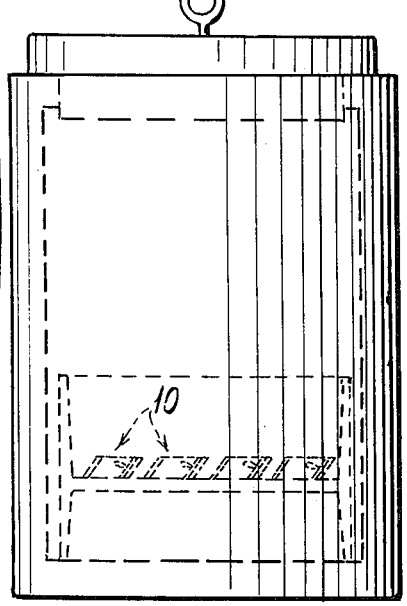
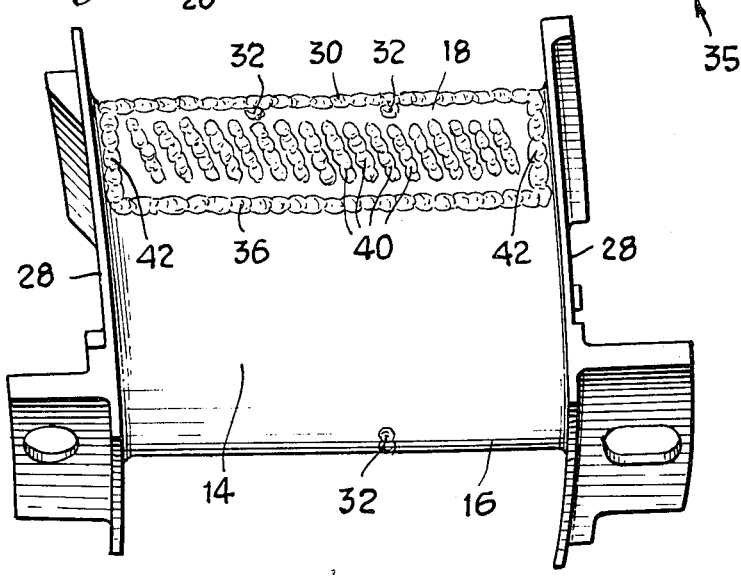

METHOD OF REFURBISHING TURBINE VANES AND THE LIKE

CROSS REFERENCES TO RELATED APPLICATIONS

1. Co-pending application, U.S. Ser. No. 574,563, filed May 5, 1975, in the name of Ralph T. DeMusis, and entitled TURBINE BLADE AIR SEAL, SIDE GRINDEER, now: U.S. Pat. No. 3,984,212 dated Oct. 5,1976.
2. Co-pending application, U.S. Ser. No. 574,564, filed May 5, 1975, in the name of Ralph T. DeMusis, and entitled TURBINE BLADE AIR SEAL, EDGE GRINDER, now: U.S. Pat. No. 3,969,848 dated July 20, 1976.
3. Co-pending application, U.S. Ser. No. 613,479, filed Sept. 15, 1975, in the names of Salvatore J. Cretella, Matthew Bernardo and Ralph T. DeMusis, and entitled REFURBISHED TURBINE VANES AND METHOD OF REFURBISHMENT THEREOF.
4. Co-pending application, U.S. Ser. No. 625,071, filed Oct. 23, 1975, in the name of Salvatore J. Cretella, and entitled TURBINE BLADE EDGE GRINDER.
5. Co-pending application, U.S. Ser. No. 648,388, filed Jan. 12, 1976, in the name of Ralph T. DeMusis, and entitled METHOD OF REFURBISHING TURBINE BLADE AIR SEAL FLANGES.
6. Co-pending application, U.S. Ser. No. 528,839, filed Dec. 2, 1974, in the name of Ralph T. DeMusis, and entitled METHOD AND MEANS FOR REPAIRING TURBINE VANES, now: U.S. Pat. No. 3,988,126 dated Oct. 26, 1976.

BACKGROUND OF THE INVENTION

This invention relates generally to the recovery of worn turbine vanes, and more particularly to the reworking and resurfacing of worn vanes by adding metal and thereafter refinishing so as to extend the useful life thereof.

Heretofore turbine vanes as used in aircraft engines, power stations and the like have had a specific useful life, after which they were removed and discarded as being no longer capable of service. Since the initial cost of such vanes is quite considerable, this practice resulted in an appreciable expense that was involved with the maintenance of the turbines. In addition to the loss of use of the equipment involved and the expense of labor in installing new vanes, there was the additional very considerable outlay required for the new replacement parts or vanes which were to be installed. This prior practice, which was necessary to maintain the equipment in reliable operating condition, therefore resulted in high operating charges.

More particularly, the present invention relates to improvements and refinements in the methods of refurbishment set forth in our co-pending application, U.S. Ser. No. 613,479 identified above.

SUMMARY OF THE INVENTION

The drawbacks represented by the prior costly procedures for maintaining turbines and like equipment are in large part obviated by the present invention, which has for its main object the provision of an improved turbine vane or airfoil part refurbishing process which greatly improves the resultant product while at the same time reducing the maintenance costs involved with wear and attrition of the airfoil. An important features of the invention is the provision of an improved turbine vane refurbishing process wherein the resultant product can meet rigid requirements of strength and performance which are readily acceptable for the fields of service involved. A still further object of the invention is to provide an improved vane refurbishing process as above, which can be practiced on a relatively large scale while yet, producing acceptable refurbished vanes at a relatively low cost.

The above objects are accomplished by a novel method for refurbishing an airfoil-shaped part of a turbine or the like, comprising the steps of applying molten metal containing a predetermined quantity of silicon to the cracks and eroded surfaces of the airfoil part so as to fill and build up the same beyond the original surfaces, sintering the part in a furnace at a temperature in excess of 2,000° F to burn off some of the silicon, removing and cooling the airfoil part, thereafter placing the part in a high pressure furnace and heating it to a temperature above 2,000° F while simultaneously applying thereto a pressure in excess of 15,000 PSI so as to drive the applied material into the cracks, effect a densification of the material, and produce an improved bond between the applied material and the eroded air-foil surface. The method further includes the steps of removing the part from the furnace, cooling the same and thereafter grinding the built-up surface of the part to restore the dimensions thereof substantially to those of a new part.

The above method has been found to provide exceptional surface conformity in the refurbished part, resulting in a dense, homogeneous surface virtually free of cracks, large pores or other surface defects. In addition, the bonding of the applied material to the eroded surface has been found to be exceptionally strong, greatly resisting separation or break-down during subsequent use of the airfoil part. Following the step of simultaneously heating and applying high pressure, it has been found that the tensile strength of the part is increased by as much as 50%, with brittleness and tendency to break or fracture under stress also reduced by a factor of two or three.

Other features and advantages will hereinafter appear.

In the drawings, illustrating preferred methods of the invention:

FIG. 1 is an elevational view of the convex side of a turbine vane whose surfaces, particularly the airfoil surfaces, have been built-up and sintered in accordance with the method of the present invention.

FIG. 2 is an elevational view of the concave side of the vane of FIG. 1.

FIG. 3 is a cross section of the vane, taken on line 3—3 of FIG. 1.

FIG. 4 is a cross section of the vane, taken on line 4—4 of FIG. 2.

FIG. 5 is a side elevational view of a plasma spray gun nozzle, shown applying a coating of molten metal to one surface of a turbine vane, in accordance with the method of the present invention.

FIG. 6 is a side elevational view of a wire vaporizer type spray gun nozzle as an alternate, shown applying a coating of molten metal to one surface of a turbine vane according to the method of the invention.

FIG. 8 is an elevational view of the convex side of a worn vane, showing certain welding steps in the processing of the piece.

FIG. 9 is a section taken on line 9—9 of FIG. 8.

FIG. 10 is an elevational view of the concave side of a worn vane, showing welded beads incorporated in the vane prior to plasma spraying.

FIG. 11 is a side elevational view of a tank for applying simultaneous heat and pressure to a built-up turbine vane after the latter has been sintered and allowed to cool.

Figure 7:
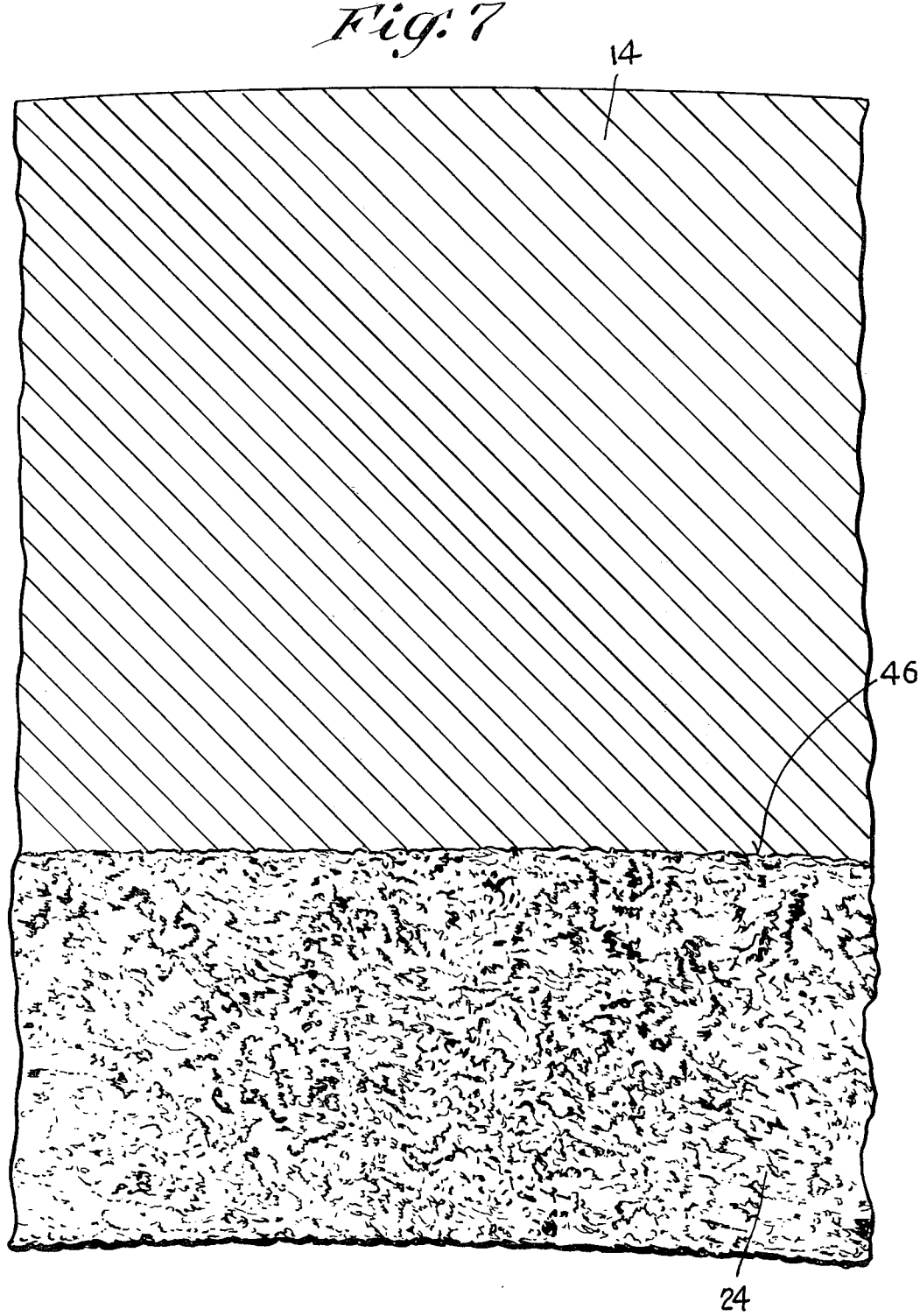
FIG. 7 is a fragmentary cross section showing a portion designated by the lines X—X of FIG. 3, greatly enlarged.

Referring to FIGS. 1–5 and in accordance with the present invention there is provided a novel and improved method for building up the airfoil surface of turbine vanes and the like which have become worn or cracked, such that the vanes so built-up can be precision ground at a later time to thereby restore the dimensions thereof to those of an original piece. The method to be described below provides an especially uniform and dense surface characteristic to the refurbished vane, with the bond between the built-up area and the base metal being highly resistant to fracture, separation or pulling apart.

FIGS. 1–4 show a typical vane 10 which has been built-up by means of a plasma spray process to be described below. The vane is seen to comprise convex and concave airfoil portions 12, 14 joined at a broad leading edge 16 and also at a narrow trailing edge 18. The vane 10 is hollow, having an airfoil-shaped inner space 20 between the airfoil portions. Adjacent the trailing edge 18, the vane 10 has cooling passages 22 which communicate with the interior space 20. Such passages are seen particularly in FIG. 2.

In FIGS. 3 and 4 the cross sectional areas 24 designate overlay metal which has been added to the vane surfaces by a plasma spray process. The overlay metal of the areas 24 can be applied to build up a thickness of as much as 30 to 40 thousandths of an inch, and can either be feathered, or uniform as shown, as the overlay approaches the trailing edge 18 of the vane.

I have found that vanes which have their surfaces built-up by a plasma spray procedure according to the process of the invention meet rigid requirements for reuse, and are capable of an extended useful operative life.

Two different methods for the application of the overlay metal to the vane 10 are shown in FIGS. 5 and 6, respectively. FIG. 5 shows a plasma spray gun 23 including a nozzle 25 from which there emanates a fine spray 27 of particles of molten metal having generally the same composition as that of the vane material, except with added silica as specified below. The gun liquifies the metal powder which is fed into it in an atmosphere of hydrogen, argon, or helium, at a temperature of 7,000° F. An alternate method of building up the vane surface is shown in FIG. 6, illustrating a wire spray gun 29 which effects vaporization of a wire alloy, also of a composition similar to that of the base metal of the vane, with added silica. The particles of molten metal 33 resulting from the vaporization of the alloy wire 31 are sprayed onto the vane 10 in the manner illustrated. Vaporization in the wire spray gun is accomplished by heat produced in an oxy-acetylene flame from a torch (not shown) or the like. Either the plasma spray method shown in FIG. 5 or the wire spray method shown in FIG. 6 has been found to provide excellent results from the standpoint of surface density and bonding to the base metal. While the wire spray method is less expensive to practice, the plasma spray method has the advantage of higher density of the built-up metal which has been deposited. In both methods, the resultant alloy closely conforms to the alloy of the base metal of which the vane was originally cast, with the exception of the increased silicon which is contained in the molten material which is being applied. I have found that by the addition of 10% silica to the powdered alloy or to the wire 31, the burn-off of silica which occurs during the spraying is such that the resultant alloy of the overlay can be made especially the same as the alloy of the base metal. The base metal alloy of vanes refurbished by the invention can be that known commercially as Haynes Alloy No. 25, or No. 31, having a composition given by the table below.

| ESSENTIAL CHEMICAL ANALYSIS OF HAYNES ALLOY # 25 | | |
|---|---|---|
| Parts by weight: | | |
| 1. | Carbon | .09 |
| 2. | Silicon | .22 |
| 3. | Manganese | 1.55 |
| 4. | Phosphorus | .018 |
| 5. | Sulfur | .007 |
| 6. | Chromium | 20.32 |
| 7. | Nickel | 10.56 |
| 8. | Tungsten | 14.30 |
| 9. | Iron | 2.25 |
| 10. | Cobalt | 50.685 |

The above alloy is also used in various welding procedures on the vanes as described below, being supplied in the form of welding rod or wire known commercially as type L-605. Hereinafter, alloys of this type are also referred to as containing substantial quantities of cobalt, chromium, tungsten and nickel with silicon present in an amount less than several percent, For the plasma spraying of the overlay metal, the Haynes alloy as above constituted is used in the form of a metal powder to which there is added 10% of silica. During the plasma spraying, the heat of the process burns off essentially the 10% additional silica whereby there remains the original alloy having a composition as set forth by the above table.

I have found that the bond between the base metal 12, 14 and overlay 24 in consequence is especially strong and durable, and not likely to fail during use of the vane.

The process of building up the vanes, starting with used, worn components is essentially as follows:

1. The used vanes are stripped of dirt, oil, etc. by placing them in a hydrochloric acid bath for 3 to 4 hours at a temperature of 180° F.

2. Thereafter, the vanes are rinsed in clear water and then vacuum annealed for two hours at a temperature of 2,175° F.

3. The annealed vanes are then visually inspected.

4. After passing visual inspection they are Zyglo inspected by means of a fluorescent penetrant.

5. All cracks on the airfoil leading edge and trailing edge are welded, as are the air cooling holes 22.

6. If the trailing edges of the vanes are worn thin, they are built-up by welding, preferably using a Tungsten Inert Gas process, with Haynes No. 25 welding rod.

7. The worn airfoil surfaces are then plasma sprayed as shown in FIG. 5, or wire sprayed as shown in FIG. 6, with metal alloy having added silica, to a thickness of from 30 to 40 thousandths. Where the vanes have been originally cast with an alloy such as Haynes No. 25 Alloy (the composition of which is given above) the powdered metal used in the plasma spraying is also of the same alloy composition and additionally has added silica, preferably in the above of 10% additional.

Figure 12:
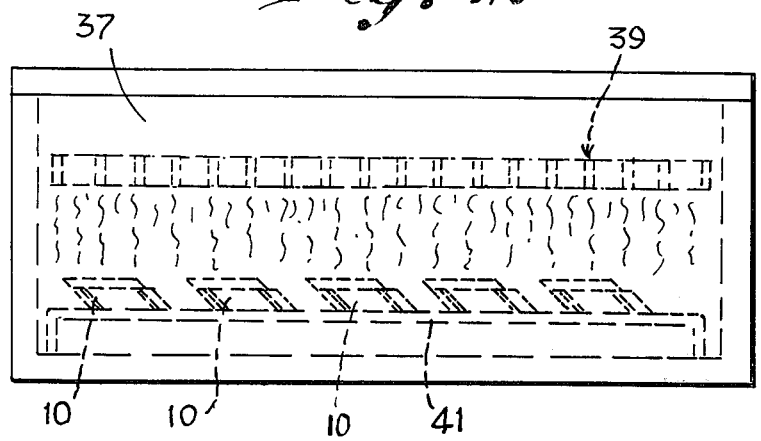
FIG. 12 is a side elevational view of a furnace suitable for sintering a plurality of vanes after they have been built-up by the plasma spray or wire spray steps shown in FIGS. 5 and 6, respectively.

8. The vanes after being thus built-up, are sintered in a vacuum or hydrogen furnace (5 microns) at 2,200° F for 1 hour, and then furnace cooled. A suitable furnace for accomplishing the sintering is shown in FIG. 12 and designated by the numeral 37. It includes heating elements 39 and a support 41 for holding a series of vanes 10.

Figure 14:
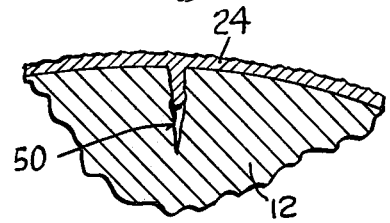
FIG. 14 is a fragmentary sectional view of the convex surface of a turbine vane which has been plasma sprayed or wire sprayed, showing a surface crack partially filled by the deposited material, before the vane has undergone processing by the heat-pressure step of FIG. 11.
Figure 15:
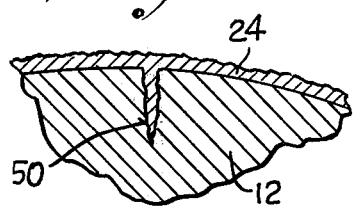
FIG. 15 is a view like FIG. 14, showing the vane after it has undergone processing by the heat-pressure step of FIG. 11.

9. Following the cooling of the vanes, they are placed in a pressure furnace diagrammatically shown in FIG. 11, comprising a tank 35 having an air-tight cover. The vanes are sintered for about 4 hours at a temperature in excess of 2,200° F and a pressure in excess of 15,000 PSI. This step has the effect of increasing the densification of the built-up layer and greatly improving the strength of the bond between the built-up plasma sprayed layer and the worn base material of the vane. The size of the pores in the metal is greatly reduced, and defects in the surface are metallurgically healed and largely eliminated by this step in the method. The simultaneous application of heat and pressure to the vane is preferably undertaken in an atmosphere of argon gas. FIG. 14 shows the surface 12 of the vane after it has been plasma or wire sprayed, but before the vane has been sintered in the tank 35. A crack 50 in the surface is shown as being only partially filled with the deposited material 24, leaving a small trapped air space. Following sintering in the tank 35 (under high pressure), the vane surface will appear as in FIG. 15, wherein the crack 50 is virtually completely filled with the deposited material 24, the air space being greatly diminished so as to be of negligible size.

Figure 13:
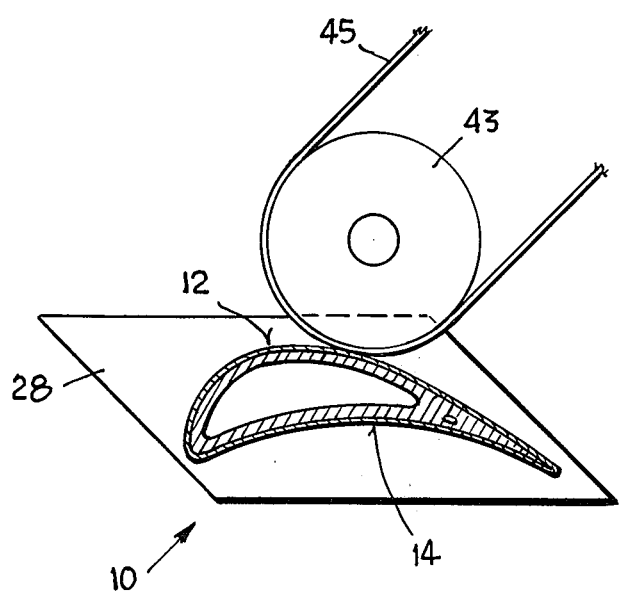
FIG. 13 is a fragmentary side elevational view of a grinding apparatus for removing controlled quantities of the built-up surface of the vane, to thereby restore the airfoil surface of the vane to its original dimensions.

10. The built-up airfoil surfaces are now re-cut by an abrading process, to produce the original surface measurements. The refinishing is preferably accomplished by an automatic machine employing an endless abrasive belt. Such grinding of the airfoil surfaces 12, 14 is diagrammatically illustrated in FIG. 13, wherein an abrasive belt 45 is carried on a drum 43, the belt directly engaging the airfoil surface. The remaining surfaces of the vane 10 are ground by hand, or in specially equipped machines (not shown), to restore their dimensions to those of a new part.

11. The vanes are then inspected by a Zyglo process.

Figure 16:
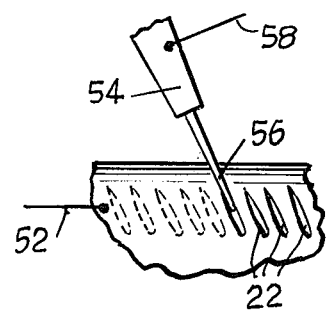
FIG. 16 is a fragmentary elevational view of the concave side of the vane after its surface has been ground by the apparatus of FIG. 13, showing ventilating holes being re-cut in the surface by an electric discharge probe.

12. The air cooling holes 22 are re-cut by a high-tension, sparking-type electric discharge probe, as in FIG. 16. The probe is indicated by the numeral 54, having an electrode 56 and a lead 58 extending to a suitable source of power (not shown). A second lead 52 from the source is temporarily joined to the vane to provide a complete path.

13. The vanes are then hand polished as may be required.

14. Finally the vanes, are inspected for accuracy of dimension.

The process as set forth above has been successfully carried out, and the resultant refurbished vane product has passed rigid tests, where the vane metal has been that known commercially as Haynes No. 25 Alloy.

FIG. 7 pictures a photomicrograph of a section through a vane which has been built-up by means of a plasma spray process but before the high pressure sintering as outlined above, taken at the location generally designated in FIG. 3 between the broken lines X—X. The designation of FIG. 7 represents an enlargement or magnification approximately of 100 times. The section of overcast metal 24 reveals a dense grain structure which is joined to the roughened surface of the vane airfoil portion 14 at an interface 46. Such roughened surface is the result of sand blasting or ball-peening the vane in preparation for the plasma spray overcast. The vane airfoil portion 14 is shown conventionally by the usual cross-hatching lines. The use of cross-hatching in the overlay 24 is considered not desirable since the cross-section surface has been etched to reveal grain structure and grain lines are of more importance. It will be seen that the grain structure of the overlay 24 is characterized by a desirable uniformity, as the section is traversed from the outer surface to the interface 46. The uniformity and the density of the plasma spray coating is important in providing for uniform wear when the vane is in use, with an absence of porous or soft spots which could break down quickly.

Turbine vanes refurbished in accordance with our invention as explained above were tested as to the bond strength of the plasma sprayed overlay or recast material on the air-foil surfaces. It was found that the plasma spray deposit is uniform and of high density. Also, the bond between the overlay material and the base metal was excellent, with no evidence of separation at any points around the periphery of the airfoil. A spectrochemical analysis of the overlay material revealed a cobalt based alloy of the Haynes Alloy No. 25 type. Moreover, the overlay material was capable of being successfully coated with oxidation-and sulfidation-resistant alloys. The strength of the overlay-to-base metal bond was equivalent or superior to conventional plasma spray type deposits.

Improved bond strength and tensile strength of the vane are realized as a result of the application of simultaneous heat and pressure, outlined in step number 9 above.

Optionally, prior to the application of a plasma spray or wire spray to the worn vane airfoil surface, it may be prepared as follows, in order to repair severely damaged vanes and cracks therein.

Referring to FIGS. 8–10, a worn vane to be refurbished is cut to provide a pair of slits 26 adjacent the end flanges 28, said slits being made from the trailing edge 18 substantially parallel with the end flanges and for a distance roughly as shown in the figure. The slits 26 relieve stresses caused by any unequal heating of the vane during the processing. After formation of the slits 26, a welded bead 30 can be applied to the trailing edge, in cases where the chordal distance (from the leading edge) has become shortened by wear. Also, welded repairs indicated as short beads 32 are made to the leading and trailing edges to fuse over any hairline cracks. A pair of beads 34, 36 (formed by welding worn areas of the convex and concave surfaces respectively) reinforces the vane airfoil structure, such beads extending in spaced relation to the trailing edge 18 and substantially coextensive therewith.

Also, as seen in FIG. 10, the air cooling passages 22 of the vane can be welded closed by beads 40. Finally, the slots 26 are welded closed by beads 42. The airfoil surfaces (and end flanges 28, if necessary) are plasma sprayed or wire sprayed to deposit a layer of alloy metal 24 as shown in FIGS. 1–6.

The layer 24 which is built-up by plasma spraying, can be as thick as from 30 to 40 thousandths of an inch. Prior to the plasma spraying build-up, a surface processing of the vanes can be carried out, in the form of a sand blast or shot peen.

It will be understood that the showings of FIGS. 8–10 illustrate optional steps in the preparation of a worn vane, prior to building up the surfaces by means of a plasma spray.

The cost represented by the refurbishment process, while significant, constitutes a small fractional value of the initial cost of producing turbine vanes of this type. The resultant refurbished product meets the essential high quality standards set for new turbine vanes, and accordingly the present invention constitutes a distinct advance and improvement in the art.

Variations and modifications are possible without departing from the spirit of the invention.

I claim:

1. The method of refurbishing an airfoil-shaped metal alloy turbine part having a composition containing substantial quantities of cobalt, chromium, tungsten and nickel, with silicon present in an amount less than several percent, comprising the steps of mixing a preparation of an overlay metal alloy comprising substantially the same respective amounts of cobalt, chromium, tungsten and nickel as contained in said turbine part and with silicon present in an amount less than several percent, adding to said preparation an amount of silicon equal to essentially at least ten percent of the silicon content of the preparation, converting said preparation and added silicon into a molten alloy, applying said molten alloy to the eroded surfaces of the airfoil part to build-up the same beyond its original surface, sintering the airfoil part in a furnace at a temperature above 2,000° F and burning off substantially all of the added silicon contained in the molten alloy that was applied to said part such that the resultant overlay alloy has substantially the same composition as the turbine part, removing and cooling the airfoil part, placing the airfoil part in a high pressure furnace, and heating the airfoil part to a temperature above 2,000° F and simultaneously applying thereto a pressure in excess of 15,000 PSI, thereby effecting a densification of the applied overlay alloy and an improved bond of the applied alloy to the eroded airfoil surfaces, removing the airfoil part and cooling the same, and grinding the overlay surface of the airfoil part to restore the dimensions thereof substantially to those of a new part.

2. The method as defined in claim 1, and including the further step of applying a bead of welding material to cracks which exist in the eroded surface of the part so as to fill the same prior to the application of the molten alloy.

3. The method as defined in claim 1, wherein the step of applying molten alloy to the part comprises plasma spraying the part with molten metal particles derived from a metal powder.

4. The method as defined in claim 1, wherein the step of applying molten alloy to the part comprises plasma spraying the part with molten metal particles derived from a metal alloy feed wire.

5. The method as defined in claim 1, wherein the step of applying molten alloy to the part comprises plasma spraying the part in an atmosphere containing argon, with molten metal particles derived from a metal powder.

6. The method as defined in claim 1, wherein the step of applying molten alloy to the part comprises plasma spraying the part in an atmosphere containing hydrogen, with molten metal particles derived from a metal powder.

7. The method as defined in claim 1, wherein the step of applying molten alloy to the part comprises plasma spraying the part in an atmosphere containing helium, with molten metal particles derived from a metal powder.

8. The method as defined in claim 1, wherein the step of applying molten alloy to the part comprises plasma spraying the part with molten metal particles derived from a metal alloy feed wire and which have been heated in an atmosphere of oxy-acetylene.

9. The method as defined in claim 1, wherein the step of grinding the built-up surface of the part comprises removing controlled quantities of concave and convex surfaces of the part in an apparatus having an abrasive belt and a substantially cylindrical drum around which the belt passes.

10. The method as defined in claim 1, and including the further step of re-cutting a series of generally cylindrical air-ventilating passages in a concave surface of the part, each of said passages being skewed with respect to planes tangent to the concave surface at the locations of the passages, respectively.

11. The method as defined in claim 10, wherein the step of re-cutting the air-ventilating passages comprises applying a high-tension sparking electrode to the concave surface of the part consecutively at a series of locations corresponding to the desired positions of the passages.

12. The method as defined in claim 11, wherein the simultaneous applying of heat and pressure is done sufficient magnitude and quantity to force the applied build-up material deeply into cracks in the surface of the part, so as to substantially completely fill any air spaces in said cracks.

13. The method as defined in claim 1, wherein the step of applying molten alloy to the eroded surfaces of the airfoil part comprises spraying the latter with a molten metal alloy in a gaseous atmosphere, wherein the step of applying simultaneous heat and pressure to the part involves a degree of heat and a magnitude of pressure which are sufficient to force the applied build-up material deeply into cracks in the surface of the part so as to substantially completely eliminate any air spaces in said cracks, wherein the said grinding step comprises removing controlled quantities of metal from the concave and convex surfaces of the part by an abrasive belt and a substantially cylindrical drum around which the belt passes, said method of claim 1 further including the step of re-cutting a series of generally cylindrical air-ventilating passages in the concave surface of the part by applying a high-tension sparking electrode thereto consecutively at a series of locations corresponding to the desired positions of the passages, each of said passages being skewed with respect to planes tangent to the surface at the locations of the passages respectively.

14. The method as defined in claim 1, and including the further step of adding to the said preparation of claim 1, the ingredients of carbon, manganese, phosphorous, sulfar and iron, and proportioning all the ingredients of the said preparation to produce a Haynes Alloy No. 25.